US012572489B2

(12) United States Patent
Jin et al.

(10) Patent No.: US 12,572,489 B2
(45) Date of Patent: Mar. 10, 2026

(54) CHIPLET WITH ADDRESS REMAPPER BLOCK

(71) Applicant: REBELLIONS INC., Seongnam-si (KR)

(72) Inventors: Young-Jae Jin, Seongnam-si (KR); Miock Chi, Seongnam-si (KR); Sanggyu Park, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 6 days.

(21) Appl. No.: 18/935,126

(22) Filed: Nov. 1, 2024

(65) Prior Publication Data

US 2025/0181536 A1 Jun. 5, 2025

(30) Foreign Application Priority Data

Dec. 4, 2023 (KR) ........................ 10-2023-0173828
Jun. 19, 2024 (KR) ........................ 10-2024-0079765

(51) Int. Cl.
*G06F 13/40* (2006.01)

(52) U.S. Cl.
CPC ...... *G06F 13/4004* (2013.01); *G06F 2213/40* (2013.01)

(58) Field of Classification Search
CPC ........................ G06F 13/4004; G06F 2213/40
See application file for complete search history.

(56) References Cited

U.S. PATENT DOCUMENTS

| | | | |
|---|---|---|---|
| 8,933,447 B1 | 1/2015 | Rahman et al. | |
| 2005/0021874 A1* | 1/2005 | Georgiou | G06F 15/167 |
| | | | 709/250 |
| 2015/0364218 A1 | 12/2015 | Frayer et al. | |
| 2016/0162217 A1 | 6/2016 | Song et al. | |
| 2017/0031841 A1* | 2/2017 | Verghese | G06F 13/102 |
| 2018/0137074 A1* | 5/2018 | Sethi | G06F 13/42 |
| 2021/0246627 A1* | 8/2021 | Konda | E02F 3/651 |
| 2021/0334213 A1* | 10/2021 | Dorris | G06F 12/1475 |
| 2022/0012173 A1* | 1/2022 | Galbi | G06F 12/0646 |
| 2022/0012195 A1 | 1/2022 | Galbi et al. | |
| 2022/0070284 A1* | 3/2022 | Patrick | H04L 69/18 |
| 2022/0156167 A1 | 5/2022 | Blagodurov et al. | |

(Continued)

FOREIGN PATENT DOCUMENTS

| | | |
|---|---|---|
| KR | 10-1990708 B1 | 6/2019 |
| KR | 10-2190125 B1 | 12/2020 |

(Continued)

OTHER PUBLICATIONS

Office Action for KR 10-2024-0079765 by Korean Intellectual Property Office dated Apr. 18, 2025.

*Primary Examiner* — Henry Tsai
*Assistant Examiner* — Christopher A Daley
(74) *Attorney, Agent, or Firm* — BROADVIEW IP LAW, PC

(57) ABSTRACT

Provided is a chiplet including an interconnect module for connecting to another chiplet, a bus interface for connecting to at least one functional module in the chiplet, and an address remapper block connected to the interconnect module and the bus interface, in which the address remapper block receives a transaction and remaps a destination address in the transaction.

17 Claims, 9 Drawing Sheets

(56) References Cited

U.S. PATENT DOCUMENTS

| | | | | |
|---|---|---|---|---|
| 2023/0162766 | A1* | 5/2023 | Jo | G11C 5/04 |
| | | | | 365/189.05 |
| 2023/0291405 | A1 | 9/2023 | Ahmad et al. | |
| 2023/0409332 | A1* | 12/2023 | Safranek | G06F 9/3836 |
| 2024/0045827 | A1* | 2/2024 | Li | H04L 12/66 |
| 2024/0295989 | A1* | 9/2024 | Kavala | G06F 3/0658 |
| 2025/0291764 | A1* | 9/2025 | Milne | G06F 15/80 |

FOREIGN PATENT DOCUMENTS

| | | | |
|---|---|---|---|
| KR | 10-2021-0143745 | A | 11/2021 |
| KR | 10-2023-0043692 | A | 3/2023 |

* cited by examiner 710                720

| ORIGINAL DESTINATION ADDRESS | REMAPPED DESTINATION ADDRESS |
|:---:|:---:|
| 1 | 2 |
| 2 | 4 |
| 3 | 3 |
| ... | ... |

CHIPLET WITH ADDRESS REMAPPER BLOCK

CROSS-REFERENCE TO RELATED APPLICATIONS

The present application claims priority Korean Application No. 10-2023-0173828, filed on Dec. 4, 2023, in the Korean Intellectual Property Office, and Korean Application No. 10-2024-0079765, filed on Jun. 19, 2024, in the Korean Intellectual Property Office, the entire disclosure of which is incorporated by reference herein.

TECHNICAL FIELD

The present disclosure relates to a chiplet including an address remapper block.

BACKGROUND

The demand for high performance and miniaturization of semiconductor devices and electronic products using the same has increased, leading to the development of various packaging technologies related to the semiconductor devices. Along with the development of these technologies, packaging technologies using chiplets are gaining attention.

Chiplet system may refer to a system that is provided by, rather than configuring chips performing various functions on one die (or substrate), dividing the chips in units of functionalities, configuring the divided chips on each of a plurality of dies (chiplet), and packaging them into one system. That is, the chiplet system was developed to overcome the limitations of existing monolithic chips, and since the chiplets can be miniaturized in units of functionalities, it is possible to overcome the size limitation of reticles, that is, the templates that print circuits on wafer surfaces using light in the photo process of semiconductors. In addition, since the yield of semiconductor manufacturing tends to be inversely proportional to the area, using the chiplets can increase the yield of semiconductor manufacturing and also reduce manufacturing costs. Accordingly, in recent years, there is an increasing demand for using the chiplet when manufacturing electronic products.

Meanwhile, for the transfer of transactions between a plurality of dies (chiplets) in the related chiplet system, the dies (chiplets) transmit the transactions by referring to the destination addresses in the transactions. Since the destination address is designated by a specific functional module such as a master IP that generates a transaction, there is a problem that it is difficult to change when the destination address of the transaction needs to be changed.

SUMMARY

In order to solve one or more problems (e.g., the problems described above and/or other problems not explicitly described herein), the present disclosure provides a chiplet including an address remapper block.

The present disclosure may be implemented in a variety of ways, including methods, devices (systems) and/or computer programs stored in computer readable storage media.

A chiplet may include an interconnect module for connecting to another chiplet, a bus interface for connecting to at least one functional module in the chiplet, and an address remapper block connected to the interconnect module and the bus interface, in which the address remapper block may receive a transaction and remap a destination address in the transaction.

The transaction may include a transaction generated by the at least one functional module in the chiplet or a transaction generated by the other chiplet.

The address remapper block may include an address remapping discriminator that receives the transaction and determines whether or not to remap the destination address of the transaction, and an address remapper that receives the transaction from the address remapping discriminator and remaps the destination address of the transaction.

The address remapper block may further include a configuration register that determines a mode of the address remapping discriminator based on an external command, and the address remapping discriminator may determine whether or not to remap the destination address of the transaction according to the mode.

The mode may include a first mode, and the address remapping discriminator in the first mode may disable a destination address remapping for the transaction and transmit the transaction to the interconnect module or the bus interface.

The mode may include a second mode, and the address remapping discriminator in the second mode may enable the destination address remapping for the transaction, and transmit the transaction remapped by the address remapper to the interconnect module or the bus interface.

The mode may include a third mode, and the address remapping discriminator in the third mode may determine whether or not to remap the destination address of the transaction based on first remapping information in the transaction.

The first remapping information may include a first indicator bit to determine whether or not to remap the destination address of the transaction.

The first remapping information may include a bit associated with a remapping count of the transaction and a predetermined reference value, and in response to determining that the remapping count is greater than or equal to the reference value, the address remapping discriminator may disable destination address remapping for the transaction.

The mode may include a fourth mode, and the address remapping discriminator in the fourth mode may determine whether or not to remap the destination address of the transaction based on second remapping information stored in the address remapper block.

The second remapping information may include a second indicator bit to determine whether or not to remap the destination address of the transaction.

The second remapping information may include a predetermined source address, and in response to determining that a source address in the transaction matches the predetermined source address, the address remapping discriminator may enable destination address remapping for the transaction.

The second remapping information may include a predetermined destination address, and in response to determining that the destination address in the transaction matches the predetermined destination address, the address remapping discriminator may enable destination address remapping for the transaction.

The second remapping information may include a bit associated with a remapping count of the transaction and a predetermined reference value, and in response to determining that the remapping count is greater than or equal to the reference value, the address remapping discriminator may disable destination address remapping for the transaction.

The remapping count may be determined based on at least one of an ID, a source address, or the destination address of the transaction, The address remapper block may further include an address remapping table register, the address remapping table register may manage an address remapping table based on information received from the configuration register, and the address remapper may remap the destination address of the transaction based on the address remapping table.

The address remapping table may include an original destination address and a remapped destination address corresponding to the original destination address.

The address remapper block may remap the destination address of the transaction to a source address of the transaction.

The address remapper block may remap the destination address of the transaction to the chiplet.

The chiplet may be a receiver side chiplet or a transmitter side chiplet, an address remapper block of the receiver side chiplet may remap the destination address of the transaction received from another chiplet, and an address remapper block of the transmitter side chiplet may remap a destination address of a transaction received from a bus interface of the transmitter side chiplet.

According to various aspects of the present disclosure, the address remapper block included in the chiplet may remap the destination address in the received transaction. As a result, if it is necessary to change the destination address of the transaction during the communication process, it is possible to change the destination address of the transaction.

According to various aspects of the present disclosure, the address remapper block included in the chiplet may remap the destination address of the transaction such that the transaction in the chiplet system can circulate a certain number of times or indefinitely. As a result, tests for defects in chiplets such as burn-in test, aging test, and Failures In Time (FIT) management, etc. can be efficiently performed.

According to various aspects of the present disclosure, the address remapper block included in the chiplet can remap the destination address of the transaction to the chiplet itself. As a result, effects that are possible by implementing a multi-chiplet system can be obtained with only a single chiplet. In addition, by utilizing this to the test software in multi-chiplet systems, it is possible to shorten the development period.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 7 is a diagram illustrating an example of an address remapping table;

DETAILED DESCRIPTION

Figure 1:
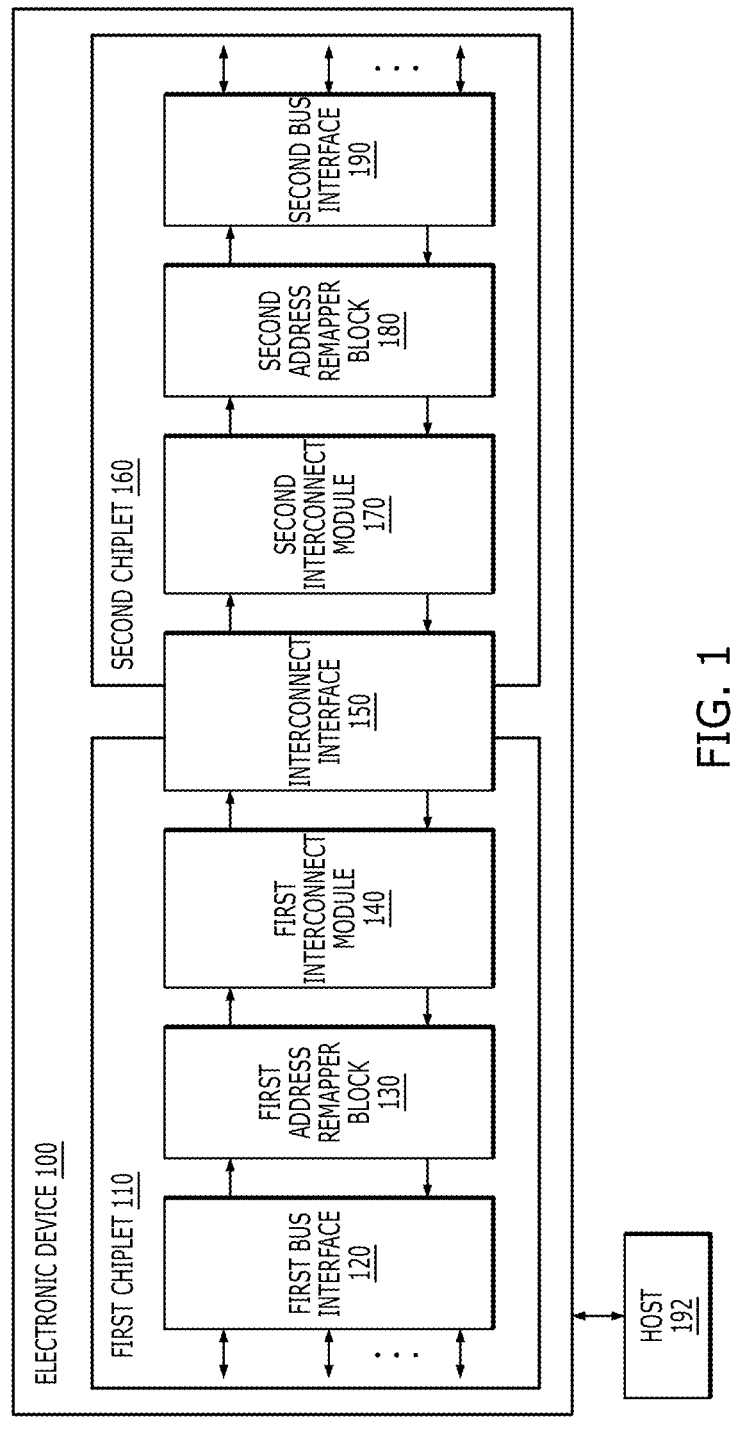
FIG. 1 is a diagram provided to explain a configuration of an electronic device including a plurality of chiplets.

Specific details for implementing the present disclosure will be described in detail with reference to the accompanying drawings. However, in the following description, detailed descriptions of well-known functions or configurations will be omitted if it may make the subject matter of the present disclosure rather unclear.

In the accompanying drawings, the same reference numerals are assigned to the same or corresponding components. In addition, in the description of the following aspects, overlapping descriptions of the same or corresponding components may be omitted. However, even if the description of the component is omitted, it is not intended that such a component is not included in any aspect.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly displays the singular forms. Further, the plural forms are intended to include the singular forms as well, unless the context clearly indicates the plural forms. Throughout the description, when a portion is stated as "comprising (including)" an element, unless specified to the contrary, it intends to mean that the portion may additionally include another element, rather than excluding the same.

In addition, the term "module" or "unit" used in the specification refers to a software or hardware component, and the "module" or "unit" performs certain roles. However, the meaning of the "module" or "unit" is not limited to software or hardware. The "module" or "unit" may be configured to be in an addressable storage medium or configured to play one or more processors. Thus, as an example, the "module" or "unit" may include components such as software components, object-oriented software components, class components, and task components, and at least one of processes, functions, attributes, procedures, subroutines, segments of program code, drivers, firmware, microcode, circuitry, data, database, data structures, tables, arrays, or variables. Components and "modules" or "units" may be combined into a smaller number of components and "modules" or "units" or further separated into additional components and "modules" or "units".

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the corresponding components are not limited by the terms.

In addition, in the following aspects, if one component is described to be "connected", "coupled", or "attached" to another component, it should be understood that the one component may be directly connected or attached to another component, or yet another component may be "connected", "coupled", or "attached" between each of the components.

In addition, the words "comprises" and/or "comprising" as used herein means that the components, steps, operations, and/or elements mentioned do not exclude the presence or addition of one or more other components, steps, operations, and/or elements.

In addition, in the following examples, "each of a plurality of A's" may refer to each of all components included in the plurality of A's, or may refer to each of some of the components included in the plurality of A's.

In the present disclosure, a "chiplet" is an integrated circuit (IC) block and may be a type of semiconductor device that is coupled, connected, and combined with another chiplet to configure one package. The dies in the chiplet system may be connected to each other through a silicon interposer and communicate with each other according to a die-to-die communication standard such as Universal Chiplet Interconnect Express (UCIe).

In the present disclosure, a "source node" may refer to a chiplet or a part of a chiplet where the transfer of specific information or data (e.g., transaction) starts.

In the present disclosure, a "relay node" may refer to a chiplet or a part of a chiplet that receives information or data from a source node or other relay node and transmits the information to another relay node or a destination node, and a "destination node" may refer to a chiplet or a part of a chiplet that receives information or data from a source node or relay node and processes the same.

Hereinafter, various aspects of the present disclosure will be described in detail with reference to the accompanying drawings.

FIG. 1 is a diagram provided to explain a configuration of an electronic device 100 including a plurality of chiplets 110 and 160. The electronic device 100 may include a first chiplet 110 and a second chiplet 160, and may be connected to a host 192. Although the first chiplet 110 and the second chiplet 160 are illustrated in FIG. 1 for convenience of description, aspects are not limited thereto, and the electronic device 100 may include any number of chiplets.

As illustrated, the first chiplet 110 may include a first bus interface 120, a first address remapper block 130, and a first interconnect module 140. The second chiplet 160 may include a second interconnect module 170, a second address remapper block 180, and a second bus interface 190. The first chiplet 110 and the second chiplet 160 may transmit and receive information and data to and from each other through the interconnect modules 140 and 170 and an interconnect interface 150. The interconnect modules 140 and 170 may be UCIe modules configured to communicate based on Universal Chiplet Interconnect Express (UCIe) standards, and may each include a controller and a PHY module. In addition, the first bus interface 120 and/or the second bus interface 190 may be an advanced eXtensible interface (AXI) type interface.

The plurality of chiplets 110 and 160 in the electronic device 100 may have unique node IDs. In addition, a transaction transmitted and received within the electronic device 100 may include an address area, and the address area may store encrypt or decrypt a unique node ID of a specific chiplet corresponding to a destination address of the transaction. The destination address stored in the address area in the transaction may be designated by at least one functional module in the chiplet that generates the transaction. In addition, the functional module provided for intra-chiplet routing function may transmit this destination address to the next chiplet in order or to an interconnect module of the next chiplet in order. The transaction may be a request transaction or a response transaction.

The first address remapper block 130 may receive the transaction and remap the destination address in the transaction. For example, the first address remapper block 130 may receive the transaction (e.g., request transaction, response transaction, etc.) generated by at least one functional module of the first chiplet 110 from the first bus interface 120 and remap the destination address in the received transaction. The first address remapper block 130 may transmit the remapped transaction to the first interconnect module 140. In this case, the first interconnect module 140 may transmit the transaction to another chiplet (e.g., the second chiplet 160) through an interconnect interface (e.g., the interconnect interface 150, etc.). Optionally or alternatively, the first interconnect module 140 set with specific software may transmit the transaction to the first address remapper block 130 through a loop back path, and the first address remapper block 130 may transmit the transmitted transaction to the first bus interface 120.

As another example, the first address remapper block 130 may receive the transaction (e.g., request transaction, response transaction, etc.) generated by another chiplet (e.g., the second chiplet 160, etc.) from the first interconnect module 140 and remap the destination address in the received transaction. The first address remapper block 130 may transmit the remapped transaction to the first bus interface 120 or the first interconnect module 140. In this case, the first bus interface 120 may transmit the remapped transaction to a specific functional module in the first chiplet 110.

The first address remapper block 130 may selectively perform the remapping of the destination address of the transaction. For example, for the transaction generated by another chiplet (e.g., the second chiplet 160, etc.) and received from the first interconnect module 140, the first address remapper block 130 may transmit the transaction to the first bus interface 120 without remapping the destination address. As another example, for the transaction received from the first bus interface 120, the first address remapper block 130 may transmit the transaction to the first interconnect module 140 without remapping the destination address.

Likewise, the second address remapper block 180 may receive the transaction and remap the destination address in the transaction. For example, the second address remapper block 180 may receive the transaction (e.g., request transaction, response transaction, etc.) generated by at least one functional module of the second chiplet 160 from the second bus interface 190 and remap the destination address in the received transaction. The second address remapper block 180 may transmit the remapped transaction to the second interconnect module 170. In this case, the second interconnect module 170 may transmit the transaction to another chiplet (e.g., the first chiplet 110) through an interconnect interface (e.g., the interconnect interface 150, etc.). Optionally or alternatively, the second interconnect module 170 set with specific software may transmit the transaction to the second address remapper block 180 through a loop back path, and the second address remapper block 180 may transmit the transmitted transaction to the second bus interface 190.

As another example, the second address remapper block 180 may receive the transaction (e.g., request transaction, response transaction, etc.) generated by another chiplet (e.g., the first chiplet 110, etc.) from the second interconnect module 170 and remap the destination address in the received transaction. The second address remapper block 180 may transmit the remapped transaction to the second bus interface 190 or the second interconnect module 170. In this case, the second bus interface 190 may transmit the remapped transaction to a specific functional module in the second chiplet 160.

Like the first address remapper block 130, the second address remapper block 180 may selectively perform the remapping of the destination address of the transaction. For example, for the transaction generated by another chiplet (e.g., the first chiplet 110) and received from the second interconnect module 170, the second address remapper block 180 may transmit the transaction to the second bus interface 190 without remapping the destination address. As another example, for the transaction received from the second bus interface 190, the second address remapper block

180 may transmit the transaction to the second interconnect module 170 without remapping the destination address.

While the internal configurations of the first chiplet 110 and the second chiplet 160 are illustrated in FIG. 1, it is to be noted that internal configurations other than those necessary to explain transmission and reception of information between the first chiplet 110 and the second chiplet 160 may be omitted. For example, the second chiplet 160 may further include another interconnect management module and another interconnect module connected to the second bus interface 190, thereby being further connected to another chiplet adjacent to the second chiplet 160. In addition, the first chiplet 110 and the second chiplet 160 may further include various functional modules for performing various functions (e.g., computation, recording, etc.).

In addition, FIG. 1 illustrates that the chiplets 110 and 160 include a single address remapper block, but aspects are not limited thereto. For example, the chiplets 110 and 160 may each separately include a receiver side (Rx) address remapper block and a transmitter side (Tx) address remapper block. In this case, the chiplets 110 and 160 may use the Rx address remapper block when performing the destination address remapping on the transactions received from other chiplets, and use the Tx address remapper block when performing the destination address remapping on the transactions generated from at least one functional module in the chiplet.

In addition, FIG. 1 illustrates that the first address remapper block 130, the first interconnect module 140, the second address remapper block 180, and the second interconnect module 170 have different configurations, but aspects are not limited thereto. For example, the first address remapper block 130 may be included in the first interconnect module 140, and the second address remapper block 180 may be included in the second interconnect module 170.

With the configuration described above, the plurality of chiplets 110 and 160 included in the electronic device 100 may remap the destination addresses of the transactions through the address remapper blocks 130 and 180. As a result, if it is necessary to change the destination address of the transaction during the communication process, the chiplets 110 and 160 may change the destination address of the transaction.

Figure 2:
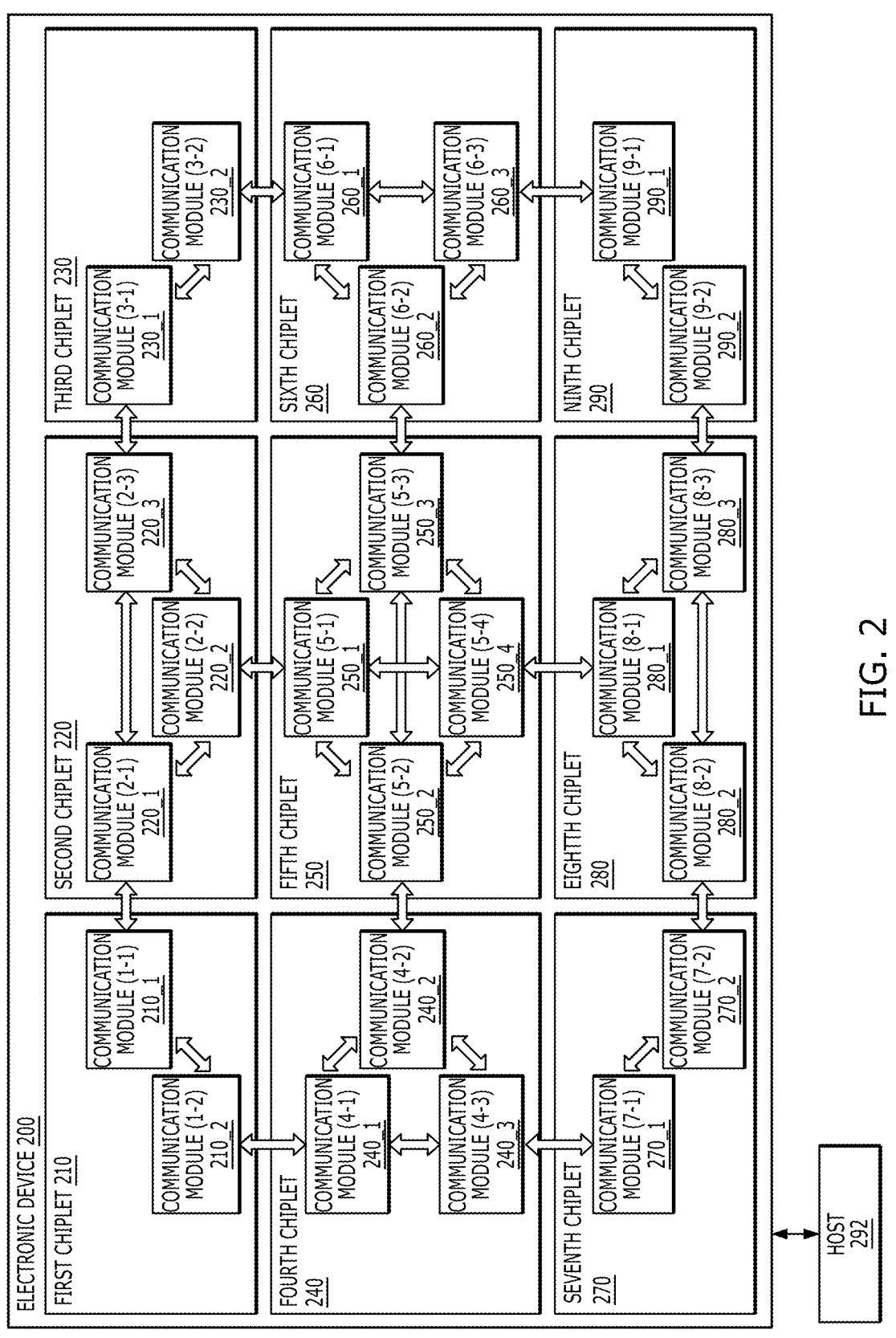
FIG. 2 is a diagram illustrating an example of an electronic device.

FIG. 2 is a diagram illustrating an example of an electronic device 200. Referring to FIG. 2, the electronic device 200 may include a plurality of chiplets. For example, the electronic device 200 may include a first chiplet 210, a second chiplet 220, a third chiplet 230, a fourth chiplet 240, a fifth chiplet 250, a sixth chiplet 260, a seventh chiplet 270, an eighth chiplet 280, and a ninth chiplet 290. However, the number of chiplets included in the electronic device 200 is not limited to the above. According to various aspects, the electronic device 200 may omit at least one of the chiplets described above, and may further include at least one more additional chiplet. In addition, the arrangement of chiplets included in the electronic device 200 is not limited to those illustrated herein, and the chiplets may be arranged in various other ways according to the purpose. The electronic device 100 including a plurality of chiplets may be packaged, and thus may be referred to as a packaged device or chiplet system.

Each of the plurality of chiplets may include various components such as a processing core, a memory, an input/output (I/O) interface, a power management circuit, a control logic, an Analog-to-Digital Converter (ADC), a Digital-to-Analog Converter (DAC), a memory, etc. Each of the plurality of chiplets may be a chiplet including the same component and performing the same or similar function. Alternatively, at least some of the plurality of chiplets may be chiplets that include different components and perform similar or different functions.

Each of the plurality of chiplets may include one or more communication modules. Each of the plurality of chiplets may include one or more communication modules capable of communicating with each of the other chiplets adjacent to each of the plurality of chiplets. For example, the first chiplet 210 may include a communication module (1-1) 210_1 and a communication module (1-2) 210_2, and the second chiplet 220 may include a communication module (2-1) 220_1, a communication module (2-2) 220_2, and a communication module (2-3) 220_3. In addition, the fifth chiplet 250 may include a communication module (5-1) 2501, a communication module (5-2) 250_2, a communication module (5-3) 2503, and a communication module (5-4) 250_4. A chiplet including the same number of communication modules may be implemented in the same architecture. For example, the fourth chiplet 240 and the sixth chiplet 260 may be implemented in the same architecture, but may be combined with different chiplets in different directions. For example, a communication module (4-1) 240_1 and a communication module (6-1) 260_1, a communication module (4-2) 240_2 and a communication module (6-2) 260_2, and a communication module (4-3) 240_3 and a communication module (6-3) 260_3 may correspond to each other.

Alternatively, each of the plurality of chiplets may include the same number of communication modules. For example, each of the plurality of chiplets included in the electronic device 200 as well as the fifth chiplet 250 may include four communication modules, and in FIG. 2, a communication module in a direction without an adjacent chiplet may be omitted for convenience of explanation.

The communication module may include a controller and a PHY layer. Additionally, the communication module may include the address remapper block, the interconnect module, etc. of FIG. 1.

Each of the plurality of chiplets may be connected to each other through the communication module and the interconnect interface (indicated by an arrow between communication modules of different chiplets in FIG. 2). For example, the fifth chiplet 250 and the eighth chiplet 280 may be connected to each other via the communication module (5-4) 250_4, a communication module (8-1) 280_1, and an interface. The chiplet interconnect interface may refer to a die-to-die interface, and may include, for example, a Universal Chiplet Interconnect Express (UCIe), etc.

Each of the communication modules in a plurality of chiplets may be connected to each other through a bus interface (indicated by an arrow between communication modules in one chiplet in FIG. 2). For example, a communication module (3-1) 230_1 and a communication module (3-2) 230_2 in the third chiplet 230 may be connected to each other through a bus interface. Likewise, a communication module (9-1) 290_1 and a communication module (9-2) 290_2 in the ninth chiplet 290 may be connected to each other through a bus interface. Additionally, aspects are not limited to the communication between communication modules, and components in each chiplet may communicate with other components through a bus interface, etc. The bus interface may be an Advanced eXtensible Interface (AXI) type interface. For example, each of the communication modules in a plurality of chiplets may be connected to each other through an AXI master port and an AXI slave port, and each of the AXI master port and the AXI slave port may include a read port and a write port.

Information may be transmitted and received within the electronic device 200 using the communication module, the interconnect interface, and/or the bus interface of each of the plurality of chiplets. For example, when information is transmitted from the fourth chiplet 240 to the ninth chiplet 290, the information may be transmitted to the ninth chiplet 290 in the order of the communication module (4-3) 240_3, a communication module (7-1) 270_1, a communication module (7-2) 270_2, a communication module (8-2) 280_2, a communication module (8-3) 280_3, and a communication module (9-2) 290_2. Alternatively, when information is transmitted from the fourth chiplet 240 to the ninth chiplet 290, the information may be transmitted to the ninth chiplet 290 in the order of the communication module (4-2) 240_2, the communication module (5-2) 250_2, the communication module (5-3) 250_3, the communication module (6-2) 260_2, the communication module (6-3) 260_3, and the communication module (9-1) 290_1. The path for routing the information from a specific chiplet to another chiplet may be determined by the architecture of the chiplet system or may be determined by various routing algorithms such as the Dijkstra algorithm, the Bellman-Ford algorithm, etc., although aspects are not limited thereto.

At least one of the plurality of chiplets may be connected to an external device (e.g., a host 292, etc.) through a host interface. For example, if abnormality occurs during the process of transferring a transaction, the first chiplet 210 connected to the host 292 may generate an interrupt for the abnormality and transmit the interrupt to the host 292 through the host interface. A chiplet that communicates with an external device may be referred to as a main chiplet, a primary die, a base chiplet, etc., and the other chiplets that do not communicate with external devices may be referred to as sub-chiplets, secondary dies, partner chiplets, etc.

For example, while both the first chiplet 210 and the second chiplet 220 are capable of communication with an external device (e.g., the host 292), if the first chiplet 210 is in communication with the external device, the first chiplet 210 may be referred to as the main chiplet, the primary die, the base chiplet, etc. In this case, the second chiplet 220 that is not in communicate with the external device may be referred to as the sub-chiplet, the secondary die, the partner chiplet, etc. Conversely, if the second chiplet 220 is in communication with the external device, the second chiplet 220 may be referred to as the main chiplet, the primary die, the base chiplet, etc., while the first chiplet 210 not in communication with the external device may be referred to as the sub-chiplet, the secondary die, the partner chiplet, etc. In addition, if both the first chiplet 210 and the second chiplet 220 are in communication with the external device, both the first chiplet 210 and the second chiplet 220 may be referred to as the main chiplets, the primary dies, the base chiplets, etc.

The host interface connecting the host 292 to the electronic device 200 or the main chiplet may include a Peripheral Component Interconnect Express (PCIe), etc.

The electronic device 200 including a plurality of chiplets, that is, the chiplet system may extend the functions of the host 292 (or the host system) and perform parallel processing for at least some functions. For example, the host 292 may distribute tasks related to at least some functions to the chiplet system, and the chiplet system may process the distributed tasks in parallel. Furthermore, the host 292 may deal with a problem occurring in the process of processing a task of the chiplet system. For example, if a problem occurs during the process of transferring a transaction, any one (e.g., the first chiplet 210, etc.) of the plurality of chiplets may generate an interrupt and transmit it to the host 292, and the host 292 may identify and deal with the problem based on the received interrupt. This not only enables the optimization and enhancement of the overall performance of the system including the host 292 and the chiplet system, but also provides a scalable computing environment. The chiplet system may perform functions of a multi-processor, a memory controller, a cache, a network interface, etc.

The electronic device 200 and the host 292 may correspond to the electronic device 100 and the host 192 of FIG. 1, respectively, and the first chiplet 210 and the second chiplet 220 may correspond to the first chiplet 110 and the second chiplet 160 of FIG. 1.

Figure 3:
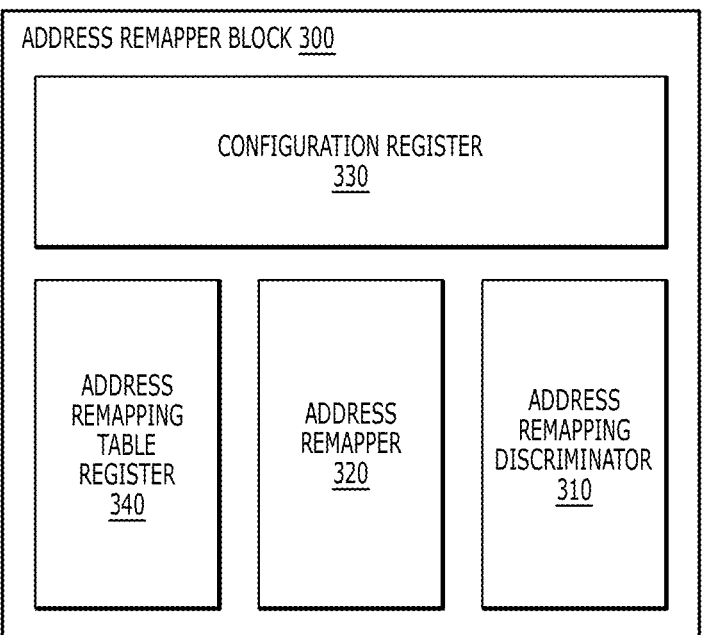
FIG. 3 is a diagram illustrating an example of an address remapper block.

FIG. 3 is a diagram illustrating an example of an address remapper block 300. The address remapper block 300 may correspond to the first address remapper block 130 and the second address remapper block 180 of FIG. 1. In addition, as illustrated in FIG. 3, the address remapper block 300 may include an address remapping discriminator 310, an address remapper 320, a configuration register 330, and an address remapping table register 340. The address remapper block 300 may be included in the Tx communication interface and/or may be included in the Rx communication interface.

The address remapping discriminator 310 may receive a transaction and determine whether or not to remap a destination address of the received transaction. For example, the address remapping discriminator 310 may receive a transaction from a bus interface (not illustrated) or an interconnect module (not illustrated), and determine whether or not to remap the destination address of the transaction according to a predetermined mode.

The address remapping discriminator 310 may be set to the first mode, which may be a disabled mode. In the first mode, the address remapping discriminator 310 may disable the destination address remapping for the transaction, and transmit the received transaction to an interconnect module (not illustrated) or a bus interface (not illustrated).

The address remapping discriminator 310 may be set to the second mode, which may be an unconditional remapping mode. In the second mode, the address remapping discriminator 310 may enable the destination address remapping for the received transaction regardless of the remapping information stored in the transaction or in some configurations (e.g., the configuration register 330, etc.) of the address remapper block 300. The address remapper block 300 (or the address remapping discriminator 310) may transmit the transaction to the interconnect module (not illustrated) so that the transaction is transmitted to the destination address of the remapped transaction.

The address remapping discriminator 310 may be set to a third mode, which may be a first remapping information-based mode. In the third mode, the address remapping discriminator 310 may determine whether or not to remap the destination address of the received transaction based on first remapping information in the transaction. The first remapping information may include a first indicator bit stored in a transaction to determine whether or not to remap a destination address of the transaction. For example, the first indicator bit may indicate, in the form of 0 or 1, whether to enable or disable the destination address remapping for the transaction, and may be stored in a certain portion of the transaction.

Additionally or alternatively, the first remapping information may include a bit associated with a remapping count of the transaction and a predetermined reference value. In this case, in response to determining that the number of performed remappings is greater than or equal to the reference value, the address remapping discriminator 310 may disable the destination address remapping for the transaction. For example, if the bit associated with the remapping count in the received transaction indicates 3 and the predetermined reference value is stored as 5, the address remapping discriminator 310 may enable the destination address remapping for the transaction. Meanwhile, if the bit associated with the remapping count in the received transaction indicates 5 and the predetermined reference value is stored as 5, the address remapping discriminator 310 may disable the destination address remapping for the transaction.

The address remapping discriminator 310 may be set to a fourth mode, which may be a second remapping information-based mode. In the fourth mode, the address remapping discriminator 310 may determine whether or not to remap the destination address of the transaction based on second remapping information stored in the address remapper block 300. The second remapping information may be stored in at least some configurations of the address remapper block 300 illustrated in FIG. 3 (e.g., the address remapping discriminator 310, the configuration register 330, etc.) or in a separate configuration of the address remapper block 300 other than the configuration illustrated in FIG. 3.

The second remapping information may include a second indicator bit stored in the address remapper block 300 to determine whether or not to remap a destination address of a received transaction. For example, the second indicator bit may be information related to whether to enable or disable destination address remapping for a transaction stored in the configuration register 330.

Additionally or alternatively, the second remapping information may include a predetermined source address. In this case, in response to determining that the source address in the received transaction matches the predetermined source address, the address remapping discriminator 310 may enable the destination address remapping for the received transaction. For example, if the source address in the received transaction is the second chiplet and the predetermined source address is the second chiplet, the address remapping discriminator 310 may enable the destination address remapping for the received transaction. Meanwhile, if the source address in the received transaction is the second chiplet and the predetermined source address is the third chiplet, the address remapping discriminator 310 may disable the destination address remapping for the received transaction.

Additionally or alternatively, the second remapping information may include a predetermined destination address. In this case, in response to determining that the destination address in the received transaction matches the predetermined destination address, the address remapping discriminator 310 may enable the destination address remapping for the received transaction. For example, if the destination address in the received transaction is the second chiplet and the predetermined destination address is the second chiplet, the address remapping discriminator 310 may enable the destination address remapping for the received transaction. Meanwhile, if the destination address in the received transaction is the second chiplet and the predetermined destination address is the third chiplet, the address remapping discriminator 310 may disable the destination address remapping for the received transaction.

Additionally or alternatively, the second remapping information may include a bit associated with a remapping count of the received transaction and a predetermined reference value. In this case, in response to determining that the remapping count is greater than or equal to the reference value, the address remapping discriminator 310 may disable the destination address remapping for the transaction. To this end, the address remapping discriminator 310 may include a counter that determines a remapping count of the received transaction, and the counter may determine the remapping count of the received transaction. The counter may determine the remapping count based on at least one of the ID, the source address, and the destination address of the transaction. For example, the counter may determine the remapping count based on the ID of the transaction, and may determine the remapping count of each of the received transactions. Alternatively, the counter may determine the remapping count by consolidating all transactions received in the address remapping discriminator 310. For example, the counter may determine the remapping count without distinguishing the transactions received by the address remapping discriminator 310, and if the predetermined reference value is 3, may disable the destination address remapping for the transactions received third or later.

The address remapper 320 may receive a transaction from the address discriminator and remap the destination address of the transaction. The address remapper 320 may remap the destination address of the transaction from a current destination chiplet to another chiplet based on the address remapping table. The address remapping table may be stored and managed in the address remapping table register 340, and the address remapper 320 may receive information associated with the address remapping table from the address remapping table register 340 when remapping the destination address of the transaction. Alternatively, the address remapping table may be stored in the address remapper 320, and the address remapper 320 may remap the destination address of the transaction based on the address remapping table stored therein.

The configuration register 330 may determine the mode of the address remapping discriminator 310 based on an external command. For example, the configuration register 330 may receive a command to determine the mode of the address remapping discriminator 310 from an external CPU (e.g., the CPU of the host 192 of FIG. 1, the CPU in the chiplet, etc.), and determine the mode of the address remapping discriminator 310 based on the received command.

The configuration register 330 may transmit information associated with the destination address remapping for the transaction to another configuration in the address remapper block 300. For example, the configuration register 330 may receive and store second remapping information from an external CPU of the address remapper block 300 (e.g., the CPU of the host 192, the CPU in the chiplet, etc. of FIG. 1). The configuration register 330 may transmit the stored second remapping information to the address remapping discriminator 310, and the address remapping discriminator 310 may determine whether or not to remap the destination address of the received transaction based on the second remapping information. As another example, the configuration register 330 may receive and store information related to the transaction remapping table from an external CPU (e.g., the CPU of the host 192, the CPU in the chiplet, etc. of FIG. 1). The configuration register 330 may transmit information associated with the stored transaction remapping table to the address remapping table register 340, and the address remapping table register 340 may generate and manage the address remapping table based on the received information.

The address remapping table register 340 may manage an address remapping table associated with the destination address remapping for the transaction. For example, the address remapping table register 340 may receive information associated with the address remapping table from the configuration register 330 and generate and store address remapping table based on the received information. Details of the address remapping table will be described below with reference to FIG. 7.

The internal configurations of the address remapper block 300 illustrated in FIG. 3 is only an example, and at least some configurations may be omitted or other configurations may be added. In addition, at least some of the operations or processes performed by the address remapper block 300 may be implemented differently, such as being performed by the configuration of the chiplets other than the address remapper block 300.

FIG. 3 illustrates the configurations of the address remapper block 300 classified by functions, but it does not necessarily mean that they are physically classified. For example, although the address remapper 320 and the address remapping table register 340 are illustrated and described separately, this is to help understand the disclosure and aspects are not limited thereto.

Figure 4:
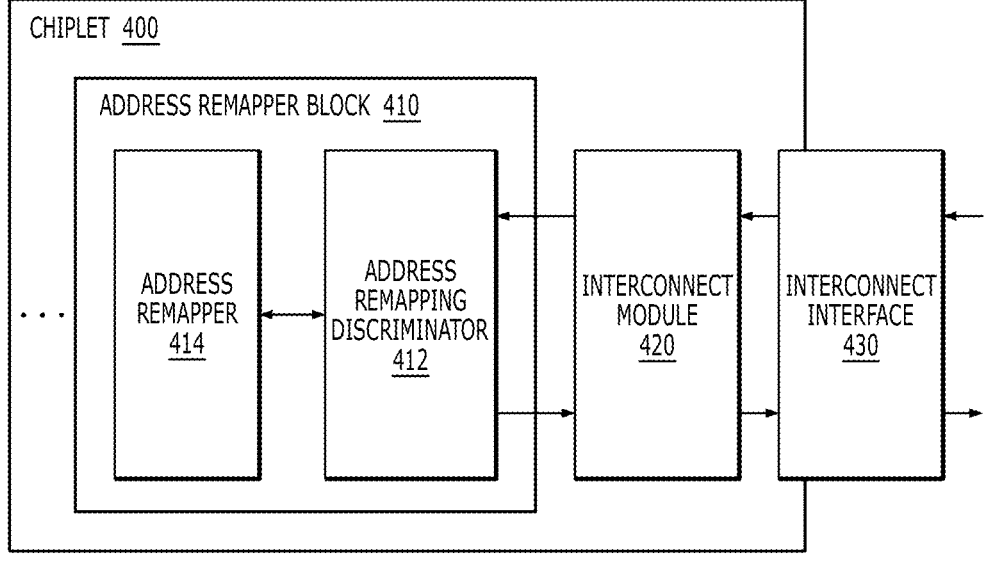
FIG. 4 is a diagram illustrating an example of remapping a destination address of a transaction.

FIG. 4 is a diagram illustrating an example of remapping the destination address of the transaction. A chiplet 400 may include an address remapper block 410 and an interconnect module 420. The address remapper block 410 may include an address remapping discriminator 412 and an address remapper 414.

The interconnect module 420 may receive a transaction from another chiplet through an interconnect interface 430. In this case, the interconnect module 420 may transmit the received transaction to the address remapping discriminator 412 of the address remapper block 410.

The address remapping discriminator 412 may determine whether or not to remap the destination address of the received transaction. For example, the address remapping discriminator 412 may determine whether or not to remap the destination address according to a predetermined mode. In the first mode, the address remapping discriminator 412 may disable the destination address remapping for the received transaction and transmit the received transaction to the interconnect module 420 or the bus interface. In the second mode, the address remapping discriminator 412 may unconditionally enable the destination address remapping for the received transaction and transmit the received transaction to the address remapper 414. In the third mode, the address remapping discriminator 412 may determine whether or not to remap the destination address of the received transaction based on the first remapping information in the transaction. In the fourth mode, the address remapping discriminator 412 may determine whether or not to remap the destination address of the transaction based on second remapping information stored in the address remapper block 410.

The address remapper 414 may receive a transaction from the address remapping discriminator 412. The address remapper 414 may remap a destination address of the received transaction. For example, the address remapper 414 may remap the transaction destination address based on the address remapping table stored therein.

The address remapping discriminator 412 may receive the remapped transaction from the address remapper 414. The address remapping discriminator 412 may transmit the remapped transaction to the interconnect module 420 or the bus interface. The interconnect module 420 may transmit the remapped transaction to a chiplet corresponding to the remapped destination address through the interconnect interface 430. In another aspect, the bus interface may transmit the remapped transaction to a specific functional module in the chiplet 400.

Figure 5:
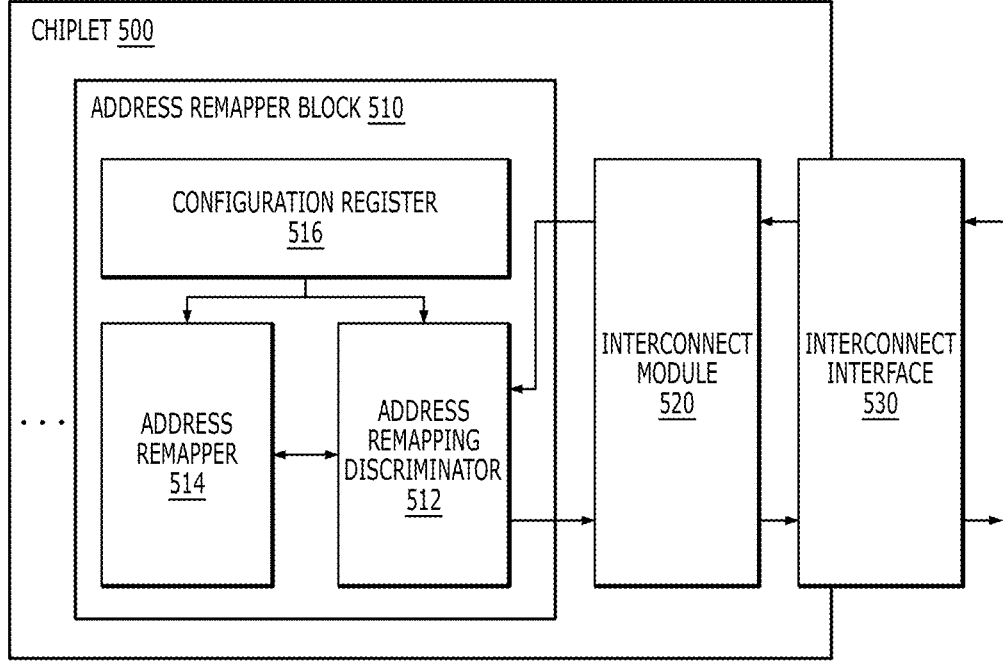
FIG. 5 is a diagram illustrating an example of remapping a destination address of a transaction according to another aspect.

FIG. 5 is a diagram illustrating an example of remapping a destination address of a transaction according to another aspect. A chiplet 500 may include an address remapper block 510 and an interconnect module 520. The address remapper block 510 may include an address remapping discriminator 512, an address remapper 514, and a configuration register 516.

The configuration register 516 may determine the mode of the address remapping discriminator 512. For example, the configuration register 516 may receive a command to determine the mode of the address remapping discriminator 310 from an external CPU (e.g., the CPU of the host 192 of FIG. 1, the CPU in the chiplet, etc.), and determine the mode of the address remapping discriminator 512 based on the received command.

The configuration register 516 may transmit information associated with the destination address remapping for the transaction to the address remapper 514. For example, the configuration register 516 may receive the information associated with the address remapping table from an external CPU (e.g., the CPU of the host 192 and the CPU in the chiplet, etc. of FIG. 1) and transmit the received information to the address remapper 514.

The interconnect module 520 may receive a transaction from another chiplet through an interconnect interface 530. In this case, the interconnect module 520 may transmit the received transaction to the address remapping discriminator 512 of the address remapper block 510.

The address remapping discriminator 512 may determine whether or not to remap the destination address of the received transaction. For example, the address remapping discriminator 512 may determine whether or not to remap the destination address according to the mode determined by the configuration register 516. In the first mode, the address remapping discriminator 512 may disable the destination address remapping for the received transaction and transmit the received transaction to the bus interface or the interconnect module 520. In the second mode, the address remapping discriminator 512 may unconditionally enable the destination address remapping for the received transaction and transmit the received transaction to the address remapper 514. In the third mode, the address remapping discriminator 512 may determine whether or not to remap the destination address of the received transaction based on the first remapping information in the transaction. In the fourth mode, the address remapping discriminator 512 may determine whether or not to remap the destination address of the transaction based on second remapping information stored in the address remapper block 510.

The address remapper 514 may receive the transaction from the address remapping discriminator 512. The address remapper 514 may remap a destination address of the received transaction. For example, the address remapper 514 may generate an address remapping table based on the information received from the configuration register 516, and remap the transaction destination address based on the generated address remapping table.

The address remapping discriminator 512 may receive the remapped transaction from the address remapper 514. The address remapping discriminator 512 may transmit the remapped transaction to the interconnect module 520 or the bus interface. The interconnect module 520 may transmit the remapped transaction to a chiplet corresponding to the remapped destination address through the interconnect interface 530. In another aspect, the bus interface may transmit the remapped transaction to a specific functional module in the chiplet 500.

Figure 6:
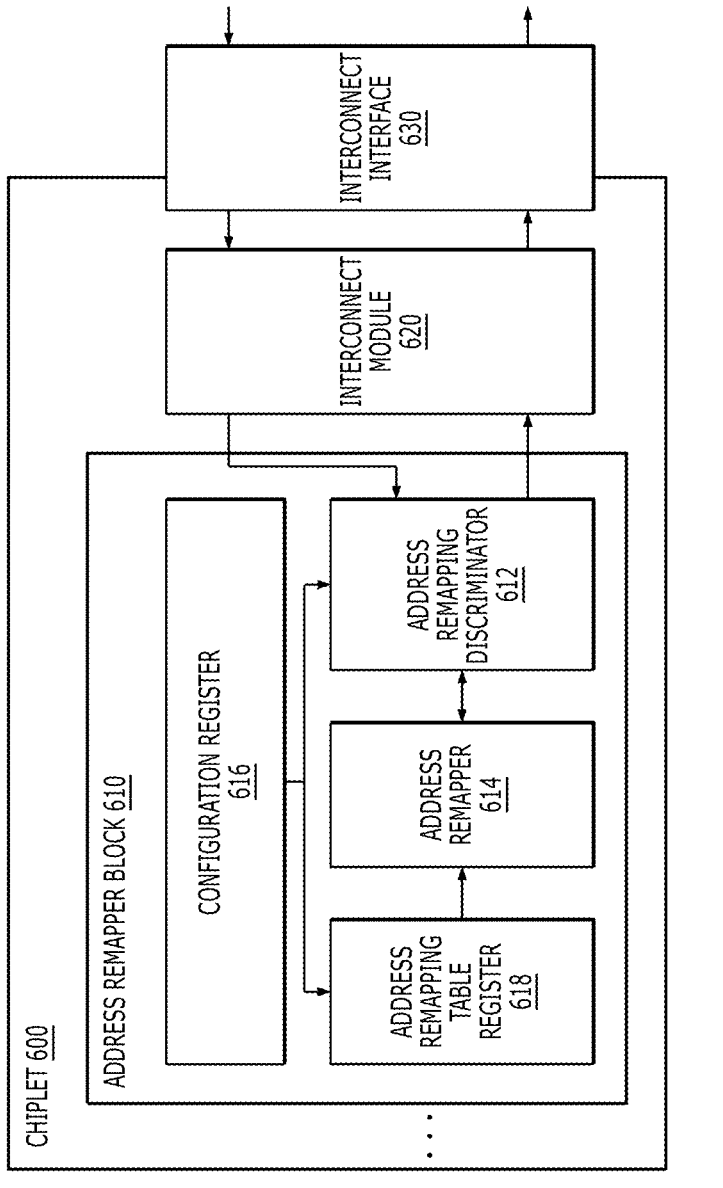
FIG. 6 is a diagram illustrating an example of remapping a destination address of a transaction according to yet another aspect.

FIG. 6 is a diagram illustrating an example of remapping a destination address of a transaction according to yet another aspect. A chiplet 600 may include an address remapper block 610 and an interconnect module 620. The address remapper block 610 may include an address remapping discriminator 612, an address remapper 614, a configuration register 616, and an address remapping table register 618.

The configuration register 616 may determine the mode of the address remapping discriminator 612. For example, the configuration register 616 may receive a command to determine the mode of the address remapping discriminator 612 from an external CPU (e.g., the CPU of the host 192 of FIG. 1, the CPU in the chiplet, etc.), and determine the mode of the address remapping discriminator 612 based on the received command.

The configuration register 616 may transmit information associated with the destination address remapping for the transaction to the address remapping table register 618. For example, the configuration register 616 may receive information associated with the address remapping table from an external CPU (e.g., the CPU of the host 192 and the CPU in the chiplet, etc. of FIG. 1) and transmit the received information to the address remapping table register 618.

The address remapping table register 618 may manage the address remapping table based on the information received from the configuration register 616. For example, the address remapping table register 618 may generate and store the address remapping table based on the information received from the configuration register 616. In addition, the address remapping table register 618 may update the stored address remapping table based on the information received from the configuration register 616.

The interconnect module 620 may receive a transaction from another chiplet through an interconnect interface 630. The interconnect module 620 may transmit the received transaction to the address remapping discriminator 612 of the address remapper block 610.

The address remapping discriminator 612 may determine whether or not to remap the destination address of the received transaction. For example, the address remapping discriminator 612 may determine whether or not to remap the destination address according to the mode determined by the configuration register 616. In the first mode, the address remapping discriminator 612 may disable the destination address remapping for the received transaction and transmit the received transaction to the interconnect module 620. In the second mode, the address remapping discriminator 612 may unconditionally enable the destination address remapping for the received transaction and transmit the received transaction to the address remapper 614. In the third mode, the address remapping discriminator 612 may determine whether or not to remap the destination address of the transaction based on the first remapping information in the received transaction. In the fourth mode, the address remapping discriminator 612 may determine whether or not to remap the destination address of the transaction based on second remapping information stored in the address remapper block 610.

The address remapper 614 may receive the transaction from the address remapping discriminator 612. The address remapper 614 may receive the address remapping table from the address remapping table register 618, and remap the transaction destination address based on the address remapping table.

The address remapping discriminator 612 may receive the remapped transaction from the address remapper 614. The address remapping discriminator 612 may transmit the remapped transaction to the interconnect module 620. The interconnect module 620 may transmit the remapped transaction to a chiplet corresponding to the remapped destination address through the interconnect interface 630. In another aspect, the bus interface may transmit the remapped transaction to a specific functional module in the chiplet 400.

FIG. 7 is a diagram illustrating an example of an address remapping table 700. The address remapping table 700 may be managed by an address remapping table register (e.g., the address remapping table register 340, etc. of FIG. 3, etc.). As illustrated in FIG. 7, the address remapping table 700 may include, as attributes, an original destination address 710 and a remapped destination address 720.

The original destination address 710 may relate to a destination address stored in the received transaction. For example, the original destination address 710 may include unique node IDs of all chiplets configuring the electronic device.

The remapped destination address 720 may relate to a destination address to be changed in the received transaction. For example, the remapped destination address 720 may include a unique node ID of the chiplet corresponding to the destination address to be changed. The remapped destination address 720 may correspond to the original destination address 710 in a one-to-one manner. Alternatively, the remapped destination address 720 may correspond to the original destination address 710 in a many-to-one or one-to-many manner. In addition, the remapped destination address 720 and the original destination address 710 may be the same as each other.

Although FIG. 7 illustrates that the address remapping table 700 includes the original destination address 710 and the remapped destination address 720 as attributes, some attributes may be added or omitted.

Figure 8:
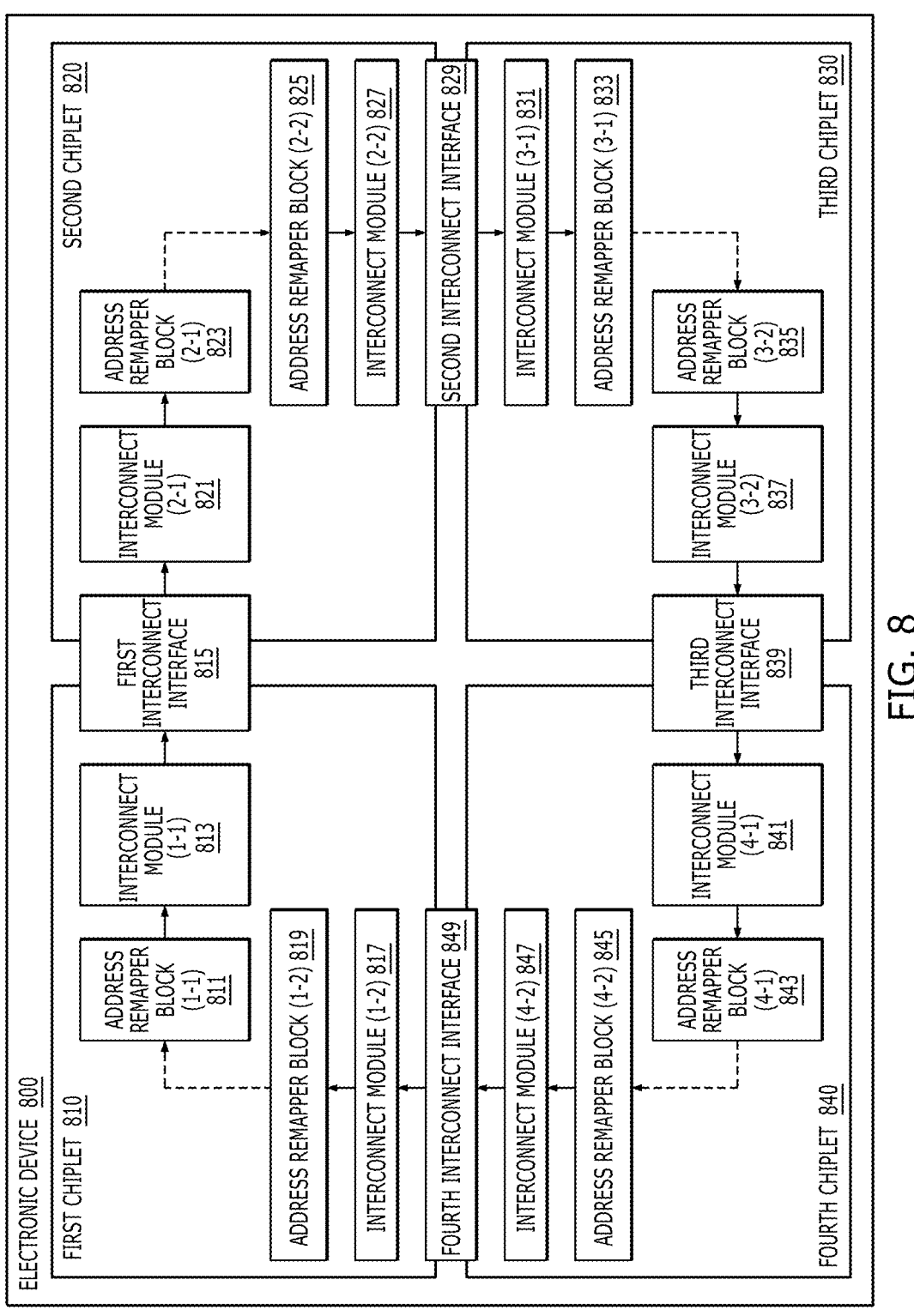
FIG. 8 is a diagram illustrating an example of transmitting transactions at a plurality of chiplets in an electronic device.

FIG. 8 is a diagram illustrating an example of transmitting transactions from a plurality of chiplets 810, 820, 830, and 840 in an electronic device 800. The electronic device 800 may include first to fourth chiplets 810, 820, 830, and 840. Although the first to fourth chiplets 810, 820, 830, and 840 are illustrated in FIG. 8 for convenience of description, aspects are not limited thereto, and the electronic device 800 may include any number of chiplets.

An address remapper block (1-1) 811 of the first chiplet 810 may transmit a transaction in which the destination address is the second chiplet 820 to an interconnect module (1-1) 813. The interconnect module (1-1) 813 may transmit the transaction to an interconnect module (2-1) 821 of the second chiplet 820 through a first interconnect interface 815. The interconnect module (2-1) 821 may transmit the received transaction to an address remapper block (2-1) 823, and the address remapper block (2-1) 823 may perform remapping for the received transaction, that is, may remap the destination address of the transaction to the third chiplet 830, and transmit the remapped transaction to an address remapper block (2-2) 825. Alternatively, the address remapper block (2-1) 823 may transmit the transaction to a specific functional module in the second chiplet 820 through a bus interface (not illustrated) of the second chiplet 820 without performing destination address remapping.

The address remapper block (2-2) 825 of the second chiplet 820 may transmit a transaction in which the destination address is the third chiplet 830 to the interconnect module (2-2) 827. The interconnect module (2-2) 827 may transmit the transaction to an interconnect module (3-1) 831 of the third chiplet 830 through a second interconnect interface 829. The interconnect module (3-1) 831 may transmit the received transaction to an address remapper block (3-1) 833, and the address remapper block (3-1) 833 may perform remapping for the received transaction, that is, may remap the destination address of the transaction to the fourth chiplet 840, and transmit the remapped transaction to an address remapper block (3-2) 835. Alternatively, the address remapper block (3-1) 833 may transmit the transaction to a specific functional module in the third chiplet 830 through a bus interface (not illustrated) of the third chiplet 830 without performing destination address remapping.

The address remapper block (3-2) 835 of the third chiplet 830 may transmit a transaction in which the destination address is the fourth chiplet 840 to the interconnect module (3-2) 837. The interconnect module (3-2) 837 may transmit the transaction to an interconnect module (4-1) 841 of the fourth chiplet 840 through a third interconnect interface 839. The interconnect module (4-1) 841 may transmit the received transaction to an address remapper block (4-1) 843, and the address remapper block (4-1) 843 may perform remapping for the received transaction, that is, may remap the destination address of the transaction to the first chiplet 810, and transmit the remapped transaction to an address remapper block (4-2) 845. Alternatively, it may transmit the transaction to a specific functional module in the fourth chiplet 840 through a bus interface (not illustrated) of the fourth chiplet 840 without performing destination address remapping.

The address remapper block (4-2) 845 of the fourth chiplet 840 may transmit a transaction in which the destination address is the first chiplet 810 to the interconnect module (4-2) 847. The interconnect module (4-2) 847 may transmit the transaction to the interconnect module (1-2) 817 of the first chiplet 810 through a fourth interconnect interface 849. The interconnect module (1-2) 817 may transmit the received transaction to an address remapper block (1-2) 819, and the address remapper block (1-2) 819 may perform remapping for the received transaction, that is, may remap the destination address of the transaction to the second chiplet 820, and transmit the remapped transaction to the address remapper block (1-1) 811. Alternatively, the address remapper block (1-2) 819 may transmit the transaction to a specific functional module in the first chiplet 810 through a bus interface (not illustrated) of the first chiplet 810 without performing destination address remapping.

Through the process described above, the plurality of chiplets 810, 820, 830, and 840 in the electronic device 800 may remap the destination address of the transaction so that the transaction may circulate a predetermined number of times or infinitely. Accordingly, tests for defects in the plurality of chiplets 810, 820, 830, and 840 in the electronic device 800, such as burn-in test, aging test, and Failures In Time (FIT) management, etc. may be efficiently performed.

Although FIG. 8 illustrates that the transaction circulates clockwise, aspects are not limited thereto, and the transaction may circulate in different directions or orders. In addition, although it is described that the destination address remapping for the transaction is performed by the address remapper block (n−1), aspects are not limited thereto. For example, in the process of transmitting a transaction with a destination address of 3 from the first chiplet 810 to the third chiplet 830 via the second chiplet 820, the address remapper block (2-2) 825 of the second chiplet 820 may remap the destination address of the received transaction to the fourth chiplet 840. In addition, although it is described above that the transaction remapping is performed in the address remapper block on the chiplet side where the transaction is received, aspects are not limited thereto, and the transaction remapping may be performed in the address remapper block on the chiplet side where the transaction is transmitted.

In FIG. 8, it is illustrated that different address remapper blocks are connected within the same chiplet as indicated by the arrows, but aspects are not limited thereto, and the address remapper blocks may be connected through a bus interface, etc. without being directly connected to each other.

Figure 9:
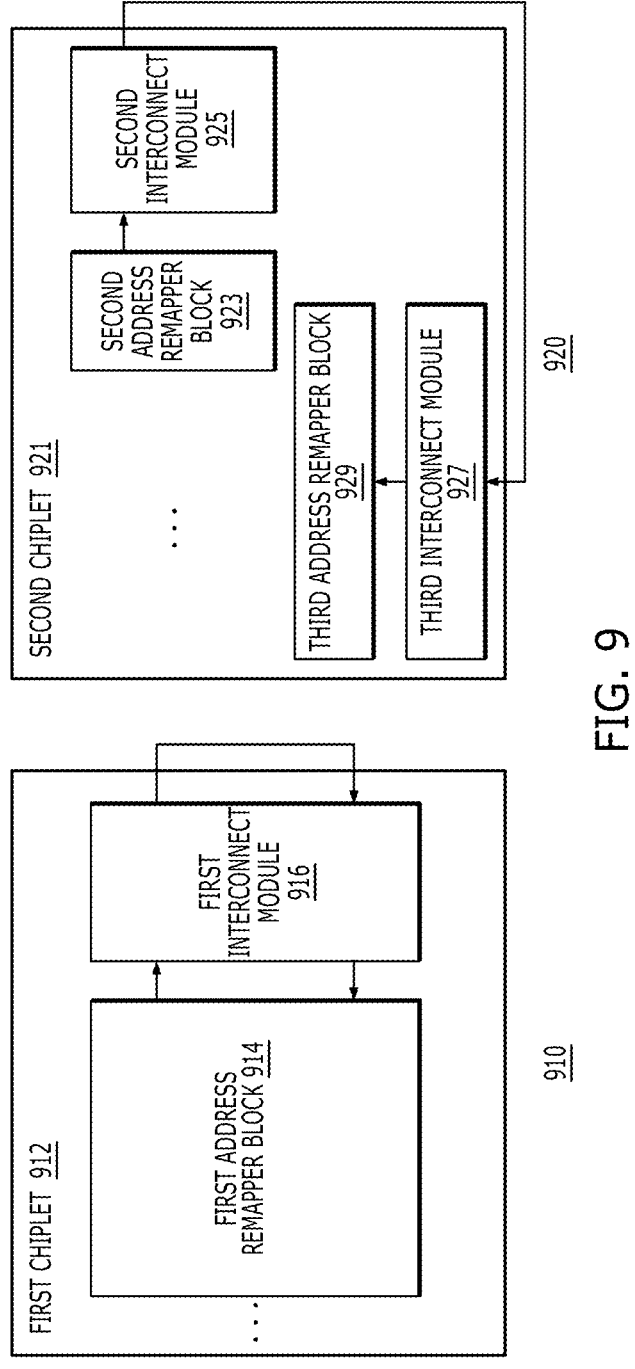
FIG. 9 is a diagram illustrating an example of looping back a transaction in a single chiplet.

FIG. 9 is a diagram illustrating an example of looping back a transaction in a single chiplet. A first example 910 represents an example in which a first chiplet 912 loops back a transaction with the same communication module. The first chiplet 912 may include at least one communication module, and a first address remapper block 914 may be included in an east side communication module.

The first address remapper block 914 of the first chiplet 912 may remap the destination address of the transaction to the first chiplet 912 and transmit the destination address to a first interconnect module 916. The first interconnect module 916 may transmit the transaction to itself, receive the transaction, and transmit the received transaction to the first address remapper block 914. The process of looping back the transaction described above may be performed at the interposer level. That is, the transmission module and the reception module in the first interconnect module 916 may be connected to each other by the interposer.

A second example 920 illustrates an example in which a second chiplet 921 transmits a transaction to a different communication module. The second chiplet 921 may include a plurality of communication modules, in which a second address remapper block 923 may be included in the east side communication module, and a third address remapper block 929 may be included in the south side communication module.

The second address remapper block 923 of the second chiplet 921 may remap the destination address of the transaction to the second chiplet 921 and transmit the destination address to a second interconnect module 925. The second interconnect module 925 may transmit the transaction to a third interconnect module 927, and the third interconnect module 927 may transmit the received transaction to the third address remapper block 929. The process of looping back the transaction described above may be performed at the interposer level. That is, a transmission module in the second interconnect module 925 and a reception module in the third interconnect module 927 may be connected to each other by an interposer.

In order to implement a multi-chiplet system including a plurality of chiplets, an interposer connecting a plurality of chiplets must be developed. Accordingly, an additional development time for the interposer is required in addition to the development time for each of the plurality of chiplets. However, the process of looping back transactions with a single chiplet may have the same effect as implementing a multi-chiplet through a simpler form of interposer than that of a multi-chiplet system. By using the configuration described above to test software used in a multi-chiplet system, it is possible to help shorten the development period.

The functions performed by each of the configurations described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The commands may be executable by at least one processor, and may cause the processor(s) to perform certain aspects of the functions described in the present disclosure.

If implemented in software, the techniques described above may be stored on a computer-readable medium as one or more commands or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may be present in the ASIC. The ASIC may be present in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable apparatus.

Although the present disclosure has been described in connection with some aspects herein, various modifications and changes can be made without departing from the scope of the present disclosure, which can be understood by those skilled in the art to which the present disclosure pertains. In addition, such modifications and changes should be considered to fall within the scope of the claims appended herein.

The invention claimed is:

1. A chiplet, comprising:
an interconnect module for connecting to another chiplet;
a bus interface for connecting to at least one functional module in the chiplet; and
an address remapper block connected to the interconnect module and the bus interface, wherein
the address remapper block receives, from the bus interface or the interconnect module, a transaction and remaps a destination address in the transaction,
the address remapper block comprises:
an address remapping discriminator that receives the transaction and determines whether or not to remap the destination address of the transaction;
an address remapper that receives the transaction from the address remapping discriminator and remaps the destination address of the transaction; and
a configuration register that determines a mode of the address remapping discriminator based on an external command,
the address remapping discriminator determines whether or not to remap the destination address of the transaction according to the mode, and
the transaction comprises a transaction generated by the at least one functional module in the chiplet or a transaction generated by the another chiplet.

2. The chiplet according to claim 1, wherein
the mode comprises a first mode, and
the address remapping discriminator in the first mode disables destination address remapping for the transaction and transmits the transaction to the interconnect module or the bus interface.

3. The chiplet according to claim 1, wherein
the mode comprises a second mode, and
the address remapping discriminator in the second mode enables destination address remapping for the transaction, and transmits the transaction remapped by the address remapper to the interconnect module or the bus interface.

4. The chiplet according to claim 1, wherein
the mode comprises a third mode, and
the address remapping discriminator in the third mode determines whether or not to remap the destination address of the transaction based on first remapping information in the transaction.

5. The chiplet according to claim 4, wherein the first remapping information comprises a first indicator bit to determine whether or not to remap the destination address of the transaction.

6. The chiplet according to claim 4, wherein
the first remapping information comprises a bit associated with a remapping count of the transaction and a predetermined reference value, and
in response to determining that the remapping count is greater than or equal to the reference value, the address remapping discriminator disables destination address remapping for the transaction.

7. The chiplet according to claim 1, wherein
the mode comprises a fourth mode, and
the address remapping discriminator in the fourth mode determines whether or not to remap the destination address of the transaction based on second remapping information stored in the address remapper block.

8. The chiplet according to claim 7, wherein the second remapping information comprises a second indicator bit to determine whether or not to remap the destination address of the transaction.

9. The chiplet according to claim 7, wherein
the second remapping information comprises a predetermined source address, and
in response to determining that a source address in the transaction matches the predetermined source address, the address remapping discriminator enables destination address remapping for the transaction.

10. The chiplet according to claim 7, wherein the second remapping information comprises a predetermined destination address, and in response to determining that the destination address in the transaction matches the predetermined destination address, the address remapping discriminator enables destination address remapping for the transaction.

11. The chiplet according to claim 7, wherein the second remapping information comprises a bit associated with a remapping count of the transaction and a predetermined reference value, and in response to determining that the remapping count is greater than or equal to the reference value, the address remapping discriminator disables destination address remapping for the transaction.

12. The chiplet according to claim 11, wherein the remapping count is determined based on at least one of an ID, a source address, or the destination address of the transaction.

13. The chiplet according to claim 1, wherein the address remapper block further comprises an address remapping table register, the address remapping table register manages an address remapping table based on information received from the configuration register, and the address remapper remaps the destination address of the transaction based on the address remapping table.

14. The chiplet according to claim 13, wherein the address remapping table comprises an original destination address and a remapped destination address corresponding to the original destination address.

15. The chiplet according to claim 1, wherein the address remapper block remaps the destination address of the transaction to a source address of the transaction.

16. The chiplet according to claim 1, wherein the address remapper block remaps the destination address of the transaction to the chiplet.

17. The chiplet according to claim 1, wherein the chiplet is a receiver side chiplet or a transmitter side chiplet, an address remapper block of the receiver side chiplet remaps the destination address of the transaction received from the other chiplet, and an address remapper block of the transmitter side chiplet remaps a destination address of a transaction received from a bus interface of the transmitter side chiplet.

* * * * *